(12) United States Patent
Matusik et al.

(10) Patent No.: US 11,541,606 B1
(45) Date of Patent: Jan. 3, 2023

(54) OBJECT MODEL ENCODING FOR ADDITIVE FABRICATION

(71) Applicant: Inkbit, LLC, Medford, MA (US)

(72) Inventors: Wojciech Matusik, Lexington, MA (US); Desai Chen, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/560,486

(22) Filed: Dec. 23, 2021

(51) Int. Cl.
| | |
|---|---|
| *B29C 64/393* | (2017.01) |
| *B33Y 50/02* | (2015.01) |
| *G06T 15/06* | (2011.01) |
| *G06F 30/10* | (2020.01) |
| *B33Y 10/00* | (2015.01) |

(52) U.S. Cl.
CPC .......... *B29C 64/393* (2017.08); *B33Y 10/00* (2014.12); *B33Y 50/02* (2014.12); *G06F 30/10* (2020.01); *G06T 15/06* (2013.01)

(58) Field of Classification Search
CPC ....... B29C 64/393; B33Y 10/00; B33Y 50/02; G06F 30/10; G06T 15/06
See application file for complete search history.

(56) References Cited

U.S. PATENT DOCUMENTS

| | | | | |
|---|---|---|---|---|
| 2011/0013211 A1* | 1/2011 | Grosz | ....................... | G06F 3/12 358/1.9 |
| 2014/0324204 A1* | 10/2014 | Vidimce | ................. | G06T 17/20 700/98 |
| 2016/0023403 A1* | 1/2016 | Ramos | .................. | B29C 64/393 425/171 |
| 2018/0169953 A1* | 6/2018 | Matusik | ............. | G05B 19/4099 |
| 2020/0189200 A1* | 6/2020 | Mosher | ................. | B29C 64/393 |
| 2020/0238625 A1* | 7/2020 | Champion | ............ | B29C 64/165 |

FOREIGN PATENT DOCUMENTS

| | | | | |
|---|---|---|---|---|
| WO | WO-2019012539 A1 * | 1/2019 | ............ | B33Y 50/00 |
| WO | WO-2021112859 A1 * | 6/2021 | | |

* cited by examiner

*Primary Examiner* — Thomas C Lee
*Assistant Examiner* — Michael Tang
(74) *Attorney, Agent, or Firm* — Occhiuti & Rohlicek LLP

(57) ABSTRACT

A method for additive fabrication by 3D printing includes processing model data representing material transition boundaries of an object to be printed to form build data for use in controlling printing of a plurality of successive layers to form the object, the build data comprising, for each location of a plurality of locations in a two-dimensional arrangement, material transition data for representing heights of material transitions in a third dimension, and repeating for each layer of the plurality of successive layers, receiving surface height data representing a height of a partial fabrication of the object at respective locations of a plurality of locations on a surface of the partial fabrication for each location of the plurality of locations, using the height at the location to access the material transition data corresponding to the location in the build data, and using the material transition data to determine material to be deposited at that location, and causing emission of the determined material at each location of the plurality of locations, thereby causing printing of the layer.

20 Claims, 3 Drawing Sheets

OBJECT MODEL ENCODING FOR ADDITIVE FABRICATION

BACKGROUND OF THE INVENTION

This invention relates to encoding of an object model for additive fabrication.

The terms additive manufacturing or "3D printing" refer to a set of methods for fabricating objects by selective addition of material. A typical manufacturing fabrication process works by slicing a digital model object (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

Inkjet 3D printing is a method of additive fabrication where jets (also known as printheads) deposit droplets of printable material to form layers. The deposited material for the layer is then solidified (e.g., using UV or visible-light radiation). The printing and solidification steps are repeated to build a three-dimensional object.

SUMMARY OF THE INVENTION

In one aspect, in general, method for additive fabrication by 3D printing includes processing model data representing material transition boundaries of an object to be printed to form build data for use in controlling printing of successive layers to form the object. The build data includes, for each of multiple locations a two-dimensional arrangement (e.g., the printable locations of the printer), material transition data for representing heights of material transitions in a third dimension. For each layer of the successive layers, surface height data representing a height of a partial fabrication of the object at respective locations is received. For each location, the height at the location is used to access the material transition data corresponding to that location in the build data. The material transition data is then used to determine material to be deposited at that location.

Aspect may include one or more of the following features.

The method includes causing emission of the determined material at each location of the plurality of locations, thereby causing printing of the layer.

The processing of the model data include storing the material transition data in a data structure (e.g., in a list) with one part per section of material along the third dimension.

The model data includes a solid model, and the processing of the model data includes performing a ray casting operation to identify material transition along rays through objects in the solid model.

The model data includes a representation of a material transition surface of the object, and the processing of the model data includes identifying intersections of a ray in the third dimension with the material transition surface. For instance, the model data includes a representation of a multiple of surface tiles making up the material transition surface, and identifying intersections of the ray with the material transition surface includes identifying intersections of the ray with the surface tiles.

In a general aspect, a method for additive fabrication by 3D printing includes processing model data representing material transition boundaries of an object to be printed to form build data for use in controlling printing of a plurality of successive layers to form the object, the build data comprising, for each location of a plurality of locations in a two-dimensional arrangement, material transition data for representing heights of material transitions in a third dimension, and repeating for each layer of the plurality of successive layers, receiving surface height data representing a height of a partial fabrication of the object at respective locations of a plurality of locations on a surface of the partial fabrication for each location of the plurality of locations, using the height at the location to access the material transition data corresponding to the location in the build data, and using the material transition data to determine material to be deposited at that location, and causing emission of the determined material at each location of the plurality of locations, thereby causing printing of the layer.

Aspects may include one or more of the following features.

The processing of the model data may include storing the material transition data in a data structure including, for each location of the plurality of locations, a list of intervals along the third dimension, each interval being associated with a material. The model data may include a solid model, and the processing of the model data may include performing a ray casting operation to identify material transition along rays extending along the third dimension and through the solid model. Each ray may have an even number of intersections with a surface of the solid model and each intersection represents a material transition. Forming the build data may include excluding any rays with an odd number of intersections with the surface of the solid model from the build data. The intervals in the list of intervals may be defined, by the intersections of the surface of the solid model.

The model data may include a representation of a material transition surface of the object, and the processing of the model data comprises identifying intersections of a ray extending along the third dimension with the material transition surface. The model data may include a representation of a plurality of surface tiles making up the material transition surface and identifying intersections of the ray with the material transition surface comprises identifying intersections of the ray with the surface tiles. The build data may be formed prior to printing layers of the object. The material types may be defined functionally in the material transition data.

Determining the material to deposit at a location may include inferring the material to deposit based on materials associated with other locations. The surface height data may be obtained by scanning a surface of the partially fabricated object. The height of the partial fabrication of the object may be non-constant across the surface of the partial fabrication. The model data may include an assembly of model objects. Each model object of the assembly of model objects may be associated with a different material.

Other features and advantages of the invention are apparent from the following description, and from the claims.

DETAILED DESCRIPTION

1 Overview

Figure 1:
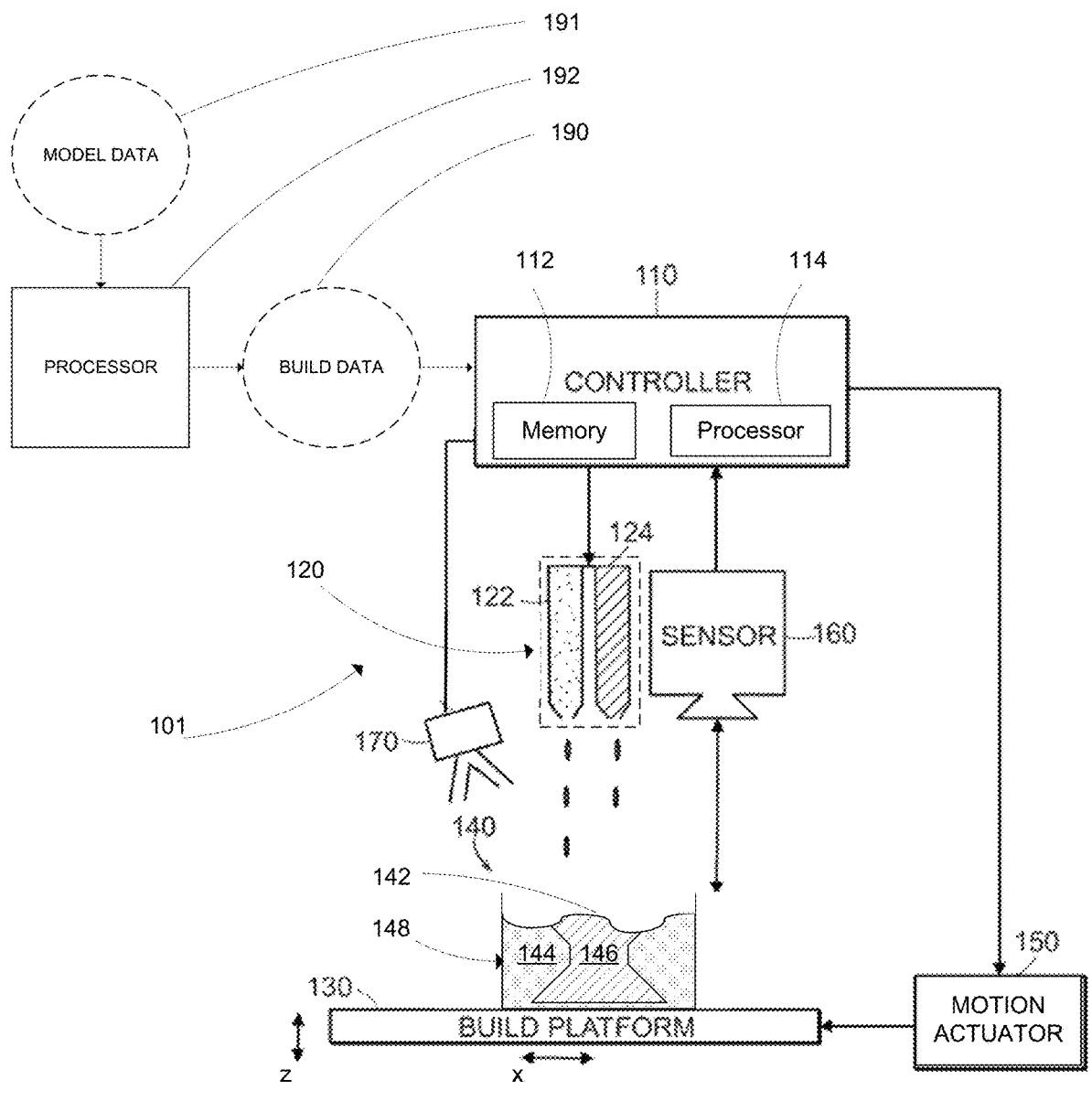
FIG. 1 is a schematic diagram of a 3D printing system.

FIG. 1 depicts a 3D printing system 100 that takes as an input model data 191 that characterizes a 3D object to be printed and causes a printer 101 to deposit material to form that object using an additive fabrication process. In FIG. 1 the fabrication is in progress and a partially-fabricated object 148 has been formed.

In general, the model data 191 is a "solid model" of the object that encodes the 3D regions in which different materials are to be formed, for example, explicitly or implicitly representing the regions for a support material 144 (e.g., wax) and a build material 146 (e.g., a curable polymer). For example, in the case when fabricating an ultimate object that is composed of a single build material, the model data 191 may represent the bounding surface of that ultimate object, and the object that is printed implicitly has support material outside that bounding surface over an entire build volume, such as a box-shaped region that completely contains the ultimate object. More generally, the model data 191 explicitly treats the outer surface of the ultimate object as an interior material transition surface between build material and support material (i.e., there are two materials in the object that is printed). Even more generally, when the ultimate object is composed on multiple build materials (e.g., polymers with different properties), or has explicit voids that are not to be filled with support material (i.e., the void is essentially treated as a further "build material) there are material transition surfaces within the ultimate object. One way that the model data 191 may be formed is to preprocess models of one or more ultimate objects to be fabricated and place them in particular locations in a build volume (i.e., so the ultimate objects do not touch) with the model data 191 representing the surrounding support material as well as the placed ultimate objections. In the discussion below, unless clear from context, references to the "object" refer to the printed object that includes both support material and one or more build materials. One form of a solid model used to represent the ultimate objects and/or the object to be printed defines 3D regions (e.g., the regions with one material) by the bounding surfaces, which may be represented using interconnected tiles, such as triangular or quad tiles. For example, such solid models may be produced by Computer-Aided Design (CAD) tools.

The printer 101 includes a controller 110 that uses a build data 190, which is derived from the model data 191, to control the operation of the printing mechanisms, which includes a jet assembly 120 for controllably emitting multiple different materials and a motion actuator 150 for moving a build platform 130 relative to the jet assembly while controlling emission of material from the jets to fabricate the object. In at least some embodiments, the printing process uses a non-contact optical scanning feedback of the object characteristics determined by a sensor 160. Examples of the printing mechanism are described in U.S. Pat. No. 10,252,466, "Systems and Methods of Machine Vision Assisted Additive Fabrication," and U.S. Pat. No. 10,456,984, "Adaptive Material Deposition for Additive Manufacturing," which are incorporated herein by reference. Further, example descriptions and detailing of precision additive fabrication using a jetting-based 3D printer are described in U.S. Pat. No. 11,173,667, "Precision System for Additive Fabrication," which is incorporated by reference herein.

Continuing to refer to FIG. 1, the printer 100 uses jets 122, 124 of the jet assembly 120 to emit material for depositing on partially-fabricated object in successive thin layers (e.g., in the order of 10 microns in thickness). In this example, one jet 122 is used to emit the support material 144 to form a support structure of the object, and another jet 124 is used to emit the build material 146 for the object 140. The build material ultimately forms the desired result of the manufacturing process after the support material is removed. In other examples, there may be multiple different build materials and corresponding jets. In general, implementations use multiple jets for each material (e.g., arranged in linear arrays) but for illustration only a single jet is illustrated per material in FIG. 1.

The sensor 160 is used to determine physical characteristics of the partially-fabricated object 148, including, a surface geometry of the surface 142 (e.g., a depth map characterizing the thickness/depth of the partially-fabricated object 148). In this figure, a cross-sectional (i.e., x-z planar) view of the partially-fabricated object 148 is pictured.

Use of an optical-scanning feedback arrangement can produce, with precision, an object by compensating for inherent unpredictable aspects of jetting and material changes after deposition (e.g., flow prior to material curing, expansion/contraction as a result of curing, clogging of jet orifices etc.). These inherent and unpredictable material changes after deposition can result in a surface 142 of a partially-fabricated object 148 being uneven (e.g., not planar and/or perfectly horizontal). To account for this aspect, the feedback arrangement uses geometric surface data corresponding to the surface 142 as scanned by the sensor 160, with the controller 110 combining the geometric surface data with build data 190 to determine what material and optionally, what amount of material should be deposited at each point along the surface 142 to fabricate a subsequent layer of the partially-fabricated object 148. In this way, sensing of the surface 142 may inform subsequent fabrication of the partially-fabricated object 148.

2 Dynamic Slicing

As introduced above, for each layer of the object to be deposited, the controller determines which material to deposit at each location on the surface of the partially-fabricated object, and uses this determination to control the emission of material as the jets move relative to the partially-fabricated object. This process of determining which materials to deposited may be referred to as "dynamic slicing" (as opposed to "pre-slicing") of the object model because the characteristics of the layer to be deposited are dynamically computed during the fabrication process (i.e., based on the scanning) rather than being solely pre-planned. That is, the scanning avoids the need to predict the surface height, which is inherently unpredictable due to numerous factors that affect the printing process. Further discussion of such dynamic slicing is found in U.S. Pat. No. 10,456,984.

To determine which material to deposit at different locations of the surface of the partially-fabricated object 148, the controller 110 accesses the build data 190 as it determines which and optionally, how much material to deposit across each layer to account for the unpredictability of the surface 142 during the fabrication of the partially-fabricated object 148. In the discussion below, the object is built up in the z direction and the jet assembly 120 moves across the x-y plane over the surface of the partially-fabricated object 148 when printing an incremental layer. The jets therefore, when printing a layer, emit material at (x,y) coordinates causing material to be added to the object at corresponding three-dimensional (x,y,z) coordinates of the object, with the z-value at which material is deposited being determined by the surface height z(x,y) of the previous layer (i.e., the height at which the deposited material lands on the partially-fabricated object after it is emitted from the jets). The build data 190 contain information used by the controller to determine which material emit at each (x,y) location according to the desired material at the coordinates (x,y,z(x,y)) in three-dimensional space of a model of the object 140. In this discussion, coordinates are expressed in a coordinate system of the original object model primarily for ease of exposition, but it should be recognized that such scanning results and printing commands are in terms of other coordinate systems, which are mapped to one another, for example, as part of a calibration process performed prior to printing the object.

One approach to encoding the model data 191 to form the build data 190 is to perform a preprocessing step to represent the object using 3D rectangular volumes (i.e., rectangular cuboids) quantizing the x, y, and z into "voxels" and representing the material of the object according to the voxel of the object. The thickness of the layers that are added can be quite small (e.g., quantizing the x and y dimensions at 30-60 microns based on the controllability of the jets and the z dimension at 10 microns based on the typical thickness of an added layer). Thus, a full voxel-based model of the object 140 that does not introduce substantial quantization error may result in the build data 190 being a very large data structure (i.e., a large number of stored values), and accessing the build data 190 during fabrication may be time- and memory-consuming and could possibly limit the speed at which a layer may be deposited.

A preferred approach as described below does not use a voxel representation of the build data 190 as a pre-processing of the model data 191. Instead, in general, the build data is encoded according to material transition heights (i.e., values of z) at (x,y) locations of the model data. Very generally, a preprocessing step to transform the model data 191 to form the build data 190 uses a variant of a "ray casting" approach to identify the material transition heights.

3 Ray-Based Build Data

As described below, a ray-based representation of the build data can provide a size- and computation-efficient means for encoding the model data. This ray-based representation may be computed as a pre-process prior to beginning printing, or alternatively may be computed during the printing process as needed.

Figure 2:
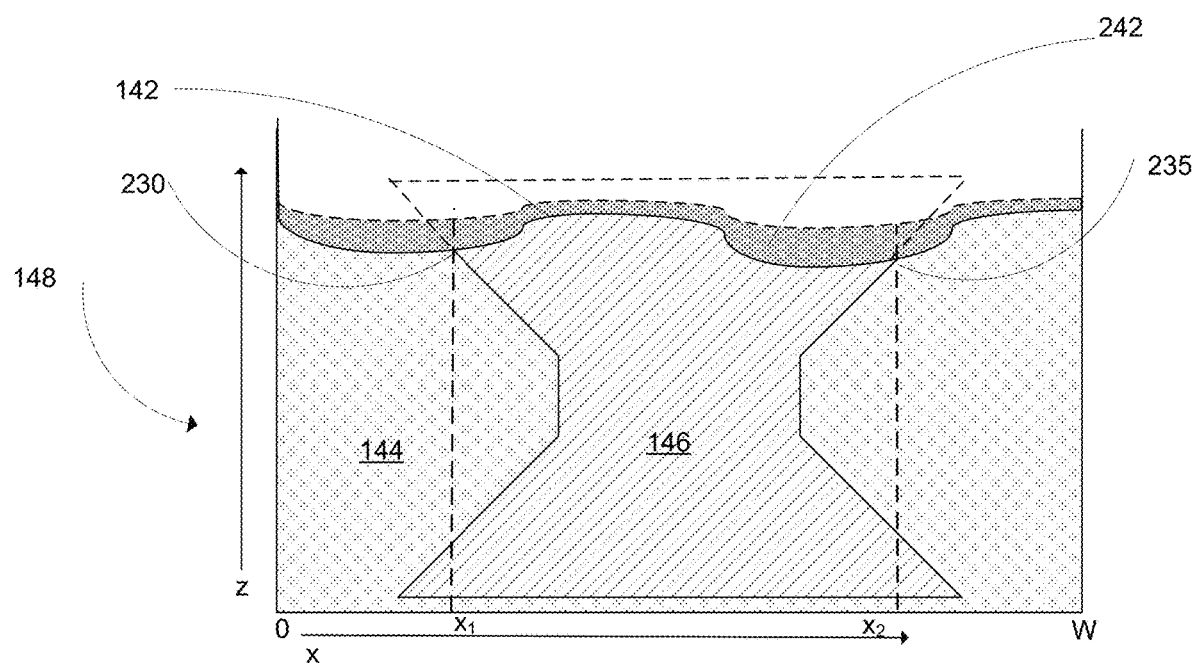
FIG. 2 is a cross-section view of a partially-fabricated object during printing.

Referring to FIG. 2, the partially-fabricated object 148 is again depicted from a cross-sectional view (i.e., in an x-z plane at a particular y value). FIG. 2 depicts an illustrative part of the process of fabricating of the object (i.e., the combination of all materials being printed, including support material and build material) in which the surface 142 represents the top of the partially-fabricated object 148 resulting from depositing previous layers, and a subsequent layer 242 (in this figure, drawn with an exaggerated thickness for illustration) is formed in response to the sensing of the surface 142. Consistent with the discussion above, the z-axis is in the direction that material is deposited, while the x-axis and y-axis (not illustrated) define a plane of relative motion of the jets relative to the partially-fabricated object 148 for the depositing of a layer on the partially-fabricated object.

As introduced above, fabricating the layer 242 involves selection of which material (e.g., in this example, support material or build material) to be deposited at each (x,y) point on the surface 142 (or at least at each point at which control is available to emit material). As illustrated, the printing of the object includes printing a support structure, using the support material 144, and what will become the desired object formed using the build material 146 (i.e., remaining after removal of the support material after the 3D printing process is complete). In the situation illustrated in FIG. 2, the depositing of material for the subsequent layer 242 includes depositing support material in some regions and build material in other regions, and in particular includes depositing the support material 144 on the surface 142 for coordinates on the surface 142 of $x<x_1$ and of $x>x_2$ and depositing the build material 146 on the surface 142 for coordinates on the surface 142 of $x_1<x<x_2$ (ignoring the y dimension in discussion of this cross-sectional view), where $x_1$ and $x_2$ are the coordinates where the material changes on the surface 142. Determining which material to be deposited at each x-value of the surface 142 (in this cross-sectional illustration) depends on determined by the z-value (i.e., the height) of the surface 142 at each x-value. For example, at point $x_1$ along the surface 142, there is a transition from support material to build material occurring at the intersection of a vertical line (a ray) from the base at $x_1$ to an intersection with the transition 228 between the two materials (noting that in this cross-section the transition appears as a line, but more generally the transition forms a surface in the three-dimensional model).

One way to cause the transition of material to be deposited as the jets make a transition from jetting locations $x<x_1$ to locations $x_1<x<x_2$, is for the controller 110 to be able to determine (in this cross-sectional illustration), for each print location x (i.e., a location along which the jet can controllably emit material) determine the height z(x). From that, the controller then determines the material m(x,z) at that (x,z) point in the model. Such repeated determination of the material causes (defines?) the transition at the point $x_1$ in FIG. 2. To the extent that build data 190 (see FIG. 1) defines material at each (x, y, z) location of the object, the specified material can be represented as a mapping of that location to the material, denoted as m(x, y, z). Because the z coordinate is determined from the scanning of the partially fabricated object, and for a printing location (x,y) may be denoted z(x,y), the material to emit at a printing location (x,y) on the surface may be denoted m(x, y, z(x, y)). That is, the output instructions generated by the controller 110 thereby comprise a material value ("m") to deposit for each controllable (x, y) point on the surface 142, taking as input the z(x, y) (i.e., the height) value of that point along the surface 142 as determined by the sensor 160.

Figure 3:
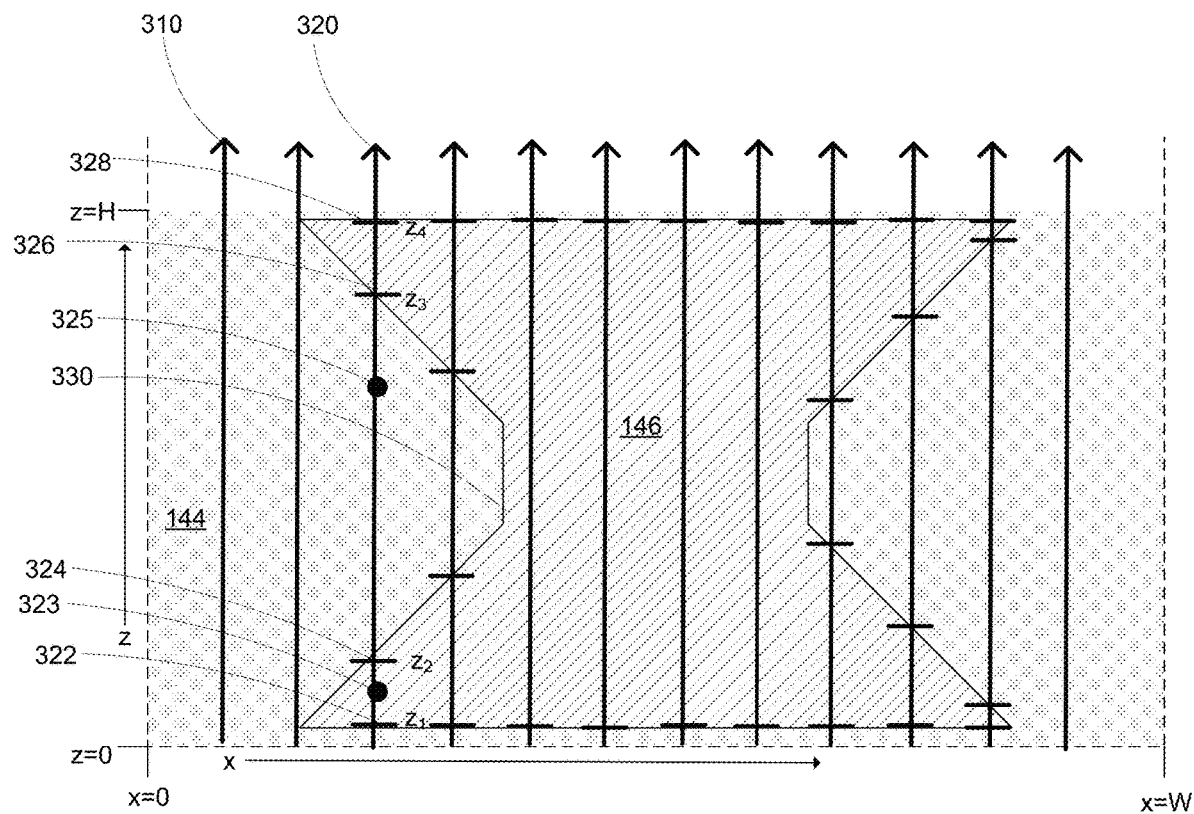
FIG. 3 is a cross-section view illustrating a preprocessing to form build data.

A preferred form of build data is described below with reference to FIG. 3, depicted is an illustrative representation of a two-dimensional cross-sectional view of material regions defined by the model data 191. This cross-sectional view depicts the build material 146 and the support material 144 and the respective regions occupied by each material, and corresponding boundaries 330 between the materials (i.e., in three dimensions these boundaries are two-dimensional surfaces, and in the cross-sectional view of FIG. 3, the boundary 330 forms a line).

Also depicted in FIG. 3 are illustrative "rays," such as a ray 310. The rays are illustrative of the process by which the processor 192 (see FIG. 1) might preprocess the model data 191 for form the build data 190 for use during printing. Each ray represents a half-line, in the z-direction, starting at the bottom (z=0) of the volume of the object being printed through the volume defined by the model data 190. While the exemplary embodiment depicted in FIG. 3 depicts only 12 rays, such is merely illustrative. More generally, ray data correspond to one or more individual rays for each coordinate in a printable resolution of the x-y plane of the model data 191.

Generally, data for one ray represents the heights (i.e., the z values) at which that ray passes through a material boundary. If the material at the bottom (z=0) is known, and there are exactly two materials, knowing the sequence of points the ray intersects a material boundary provides a way to determine the material the ray is passing through at each height z. For example, given a particular height z, if there are an even number of intersections of the ray below that height, the material is the same as the material at the bottom of the object (e.g., support material in this example), while if there are an odd number of intersections below that height, the material is the other material (e.g., the build material in this example). Ray data for the overall object represents, for each of the (x,y) locations of rays, the set of intersecting heights of the ray are that location and the material boundary in the model. As an example, consider the ray 310 through the model volume. The boundary intersection points of that ray are at heights $z_1$, $z_2$, $z_3$, and $z_4$ (at points 322, 324, 326, and 328, respectively).

3.1 Printing Using Ray-Based Build Data

During printing, the controller uses build data 190 that represents the boundary intersections of rays to determine which material to emit at an (x,y) location. The scanning of the surface has determined that the height at that location is z(x,y), and the controller accesses the ray data for the ray at the location (x,y), and then determines which material is present at height z(x,y) of that ray by determined if there are an even or odd number of boundary intersections below that height on the ray. For example, to determine which material is present at a point 323 on the ray 320, the controller determines that the corresponding z height of that point is greater than one boundary intersection point (the boundary point 322), and, since one is an odd number, the z-value of the point 323 on the ray 320 thus is assigned to the build material 146. Similarly, a point 325 on the ray 320 has a greater z-value than two boundary points (the boundary points 322 and 324), and thus, since two is an even number, the z-value of the point 325 is assigned to the support material 144.

In the discussion above each ray data represents heights of transitions between two materials. In situations in which there are three or more materials, various ways of encoding the ray data may be used. For example, one set of intersections may be recorded for each material, and only boundary intersections involving that material are considered for that ray. When printing and considering a particular (x,y) location, each of the material-specific rays are considered for that location, and the material for which there are an odd number of boundary intersections below the surface height determine the material to print at that location.

Various data formats and lookup procedures may be used for the ray data. One form of data for a ray may take the form of a list of boundary intersection values, sorted by z-values. Lookup of the number of intersections below a certain height may be performed, for example, by a sequential search through the list, or using a binary search. Because the object has successively increasing height, a sequential search may be optimized by recording the next height of an intersection determined for the previous layer, thereby avoiding having to start the search at the start of the list for each new layer.

Yet other data structures and procedures can be used without departing from the principle of the ray representation. For example, with two or more materials, each ray may be encoded using a run-based coding approach in which each run in a material is represented by an identifier of the material and the length of the run along the ray in that material or a value of the exit height from the material. Search for the material then can comprise a sequential or binary search through the data for the runs as in the two-material case introduced above.

As introduced above, the controller is able to control ejection of material on the object at a particular resolution (e.g., at 30 micron resolution in the x direction and 60 micron resolution in the y direction). One form of build data 190 includes ray data for each location at that printing resolution.

3.2 Pre-Computing Ray-Based Build Data

In some embodiments, the ray data of the build data 190 are determined by the processor 192 prior to beginning printing of the object, such that the build data 190 comprises an already-calculated array of rays and associated boundary intersection values for each ray.

Pre-processing to create an array of ray data uses as input the model data 191. In general, the model data 191 represents a solid model defining material boundaries, such as material transitions of the object, including the boundary between build material and support material defining the shape of the ultimate object produced by the manufacturing process. As introduced above, one form of solid model, which may be produced using CAD tools, represents the boundaries in terms of polygonal (i.e., triangular) planar tiles (i.e., surface patches), with curved surfaces being approximated with such linear tiles. Alternative representations of such boundaries may use other forms of patches, for example, using bilinear patches on a quad mesh of boundary points, splines and the like.

One approach to determining the boundary intersection points of a ray is to use a ray casting procedure in which the input is the starting point of a ray (e.g., a bottom point (x,y,z=0)) and determining all intersections of a ray from that point in the positive z direction with any surface patch of the solid model. Such a search may be accelerated using special-purpose hardware, such as a Graphical Processing Unit (GPU), which has access to (e.g., is loaded with data for) the surface patch information. In some examples, the pre-processing can be accomplished by dividing the model data into tiles and processing each tile on a different processor of a multi-core processor.

Referring to FIG. 5, a top view of a material boundary shows surface tiles (in this illustration triangles) and corresponding boundaries, such as a boundary line 505 of a solid model 500, as well as locations of rays and their corresponding cells (i.e., rectangular cells at the controllable resolution of the jets). Note that in this view, the height (z value) of each boundary generally varies over the x-y extent of each tile.

3.3 Discontinuous Boundary Tiles

The procedures described above for computing ray data, and its subsequent use during printing, essentially assume an ideal representation of surfaces with exactly aligned boundary tiles, and exact ray casting to determine intersections with such tiles. A preferred approach is robust to imperfections in the solid model and/or in computation of intersections with boundary tiles. For example, the solid model may be imperfect with inexact alignment of the edges of tiles potentially leaving a "gap" in the boundary surface. Even if there is a very small space between such misaligned tiles, a ray may unfortunately pass through such a gap and miss a boundary intersection point. A consequence may be that the determination of whether there are an even or odd number of intersection points below a certain height is incorrect, resulting in an incorrect determination of which material to apply at the location of the ray.

One approach to reducing the risk of ray data being incorrect (and therefore the material determination being incorrect) due to gaps between boundary tile is to use an oversampling approach in which, for each addressable cell for the printer jets, multiple rays that are displaced in the x and/or y directions are cast though the solid rather than relying on a single ray, corresponding to each (x, y) coordinate. For example, 4 rays are used for each printable (x,y) coordinate. For illustration, each printable coordinate (x,y) can be considered to have a cell surrounding it, and when multiple rays are used, they may be chosen such that they are all in the cell for the (x,y) location for which the material may be determined. Each of the multiple rays has corresponding ray data. During printing, when determining the material to deposit at an (x,y) location of a cell, the controller considers all the rays in the cell for that location, and for each ray the controller determines the material to deposit based on that ray. Typically, the material for all the rays will be determined to be the same material. However, if there is an imperfection of alignment of tiles causing an incorrect determination of the number of boundary intersections below the height scanned for that (x,y) location, in general, only a minority of the rays will be affected, and a majority determination of the material from the rays of that cell will determine the correct material. In general, rays that have an odd number of transitions can be discarded (any ray that goes into the object volume must come out). In some examples, only one ray is chosen for each (x,y) location.

Yet other approaches to compensating for imperfect alignment of surface tiles may be used. For example, rather than oversampling the ray data (i.e., with multiple rays per cell), an error correction procedure may be used to introduce missing boundary intersections based on a boundary smoothness constraint during the preprocessing. One such error correction procedure may use multiple rays per cell during pre-processing, with an aggregation step to combine the intersections to form a single aggregated ray for the cell for use during printing that effectively introduces any missing intersections at a height range in a minority of rays for a cell.

3.4 Run-Time Computation

Although introduced above as a pre-processing step, the determination of ray data may be performed at printing time with sufficient computational resources. An advantage of such printing time determination may be that storage is not required for ray data at the addressable resolution of the printer. Various optimizations of storage of the surface data of the model data 191 may be used to accelerate such printing time computation, for example, partitioning such surface data according to ranges of height so that the search for ray intersections requires fewer computations.

3.5 Layer Thickness

In the discussion above, the controller determines the material to emit according to the material determined to be at the surface. In addition to determining the material, the controller may determine the thickness of material to deposit of the jet mechanism permits such control. As described in U.S. Pat. No. 10,456,984, a variable thickness may be chosen to reduce the variation in height or resulting a planar surface after printing the next layer.

The controller may also consider material transition that may occur just above the scanned surface. For example, the ray data may indicate that there is a material transition less than one maximum layer thickness above the surface, in which case the controller may emit less material so that the resulting height does no exceed the height of the next material transition.

Also as introduced in U.S. Pat. No. 10,456,984, the material at a height somewhat above the scanned surface height, for example, one-half a layer thickness above the scanned surface height, may be used in determining the material to deposit.

In yet other approaches, when the ray data indicates that a material transition will occur in the thickness of a layer, a mix of material may be emitted at that location to match the factional parts of each material that should be present at that location.

3.6 Solid Models with Implicitly Represented Materials

As is mentioned above, in some examples, the solid models implicitly represent which materials are associated with build locations. For example, a solid model may be a surface model of an object, where a geometry and orientation of the object implies which where support and build material should be printed. For example, regions within the surface model of the object imply that build material should be printed in those regions. Regions outside the surface model where there is overhanging build material imply that support material needs to be printed beneath. Regions outside the surface model where there is no overhanging build material imply a void (i.e., no print or build material be printed).

One technique for identifying implicitly represented materials is to maintain a "$max_z$" value for each ray corresponding to an (x,y) location. When the controller determines which material is present at a height z(x,y) of a ray at location (x,y) the controller first determines whether the height z(x,y) is within the solid model (i.e., if there are an odd number of boundary transitions). If the point (x,y,z(x,y)) is within the solid model then the material is build material. If the point (x,y,z(x,y)) is outside the solid model, then the controller compares z(x,y) to $max_z$ for the (x,y) location. If z(x,y) is greater than $max_z$, then there is no overhanging build material and the material is void. If z(x,y) is less than $max_z$, then there is overhanging build material and the material is support material.

In some examples, to ensure that all printed objects are surrounded by at least some support material, a height map of the objects to be printed (i.e., a "$z_{max}$ image") is generated. Then, each point in on the surface of the height map is increased in a direction substantially orthogonal to the surface at that point by a small amount (e.g., 2 mm) or dilated. The increased or dilated height map is used by the controller to add support material (e.g., a 2 mm coating of support material) to the printed objects.

3.7 Multi-Material Object Representations

In some examples, multi-material objects are represented as an assembly of multiple objects (e.g., each from a separate STL file) of different materials. Each object in the assembly is assigned an importance or priority. At the interface between the surfaces of two objects, the two surfaces may not align exactly. This issue is resolved by using the surface of the object with the higher importance or priority at the interface and ignoring the surface of the lower importance or priority object.

In some examples, the materials of objects are functionally defined, where one or more material functions (e.g., f(x,y,z)) are called to determine the material for an (x,y,z) location. In some examples, the material composition for the entire object can be defined in a single material function. In other examples, different material functions can be used for different intervals of the rays. The functions return the material for that interval. More complex materials can be represented in this way including, for example, gradients and mixtures of materials.

4 Implementations

Implementations may use a hardware processor that executes instructions, which are stored on a non-transitory machine-readable medium. For example, the processor may be a general-purpose processor, or a special-purpose processor for instance a graphics processing unit (GPU). Some implementations may use circuitry such as application-specific integrated circuits (e.g., ASICs) and/or field pro- grammed circuitry (e.g., 20 FPGAs) in addition or instead of hardware processors.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for additive fabrication by 3D printing comprising:
   processing model data representing material transition boundaries of an object to be printed to form build data for use in controlling printing of a plurality of successive layers to form the object, the build data comprising,
      for each location of a plurality of locations in a two-dimensional arrangement, material transition data for representing heights of material transitions in a third dimension,
      wherein the material transition data comprises a list of multiple variable-length intervals along the third dimension, each interval including a coordinate of material transition at an end of the interval, and each interval being associated with a corresponding material; and
   repeating for each layer of the plurality of successive layers,
      receiving surface height data representing a height in the third dimension of a surface of a partial fabrication of the object at respective locations in the two-dimensional arrangement,
      for each location of the plurality of locations in the two-dimensional arrangement, using the height at the location to access the material transition data corresponding to the location in the build data, and using the material transition data to determine material to be deposited at that location by comparing the height and a coordinate of a material transition in the material transition data, and
      causing emission of the determined material at each location of the plurality of locations, thereby causing printing of the layer.

2. The method of claim 1, wherein the model data comprises a solid model, and the processing of the model data comprises performing a ray casting operation to identify material transition along rays extending along the third dimension and through the solid model.

3. The method of claim 2 wherein each ray has an even number of intersections with a surface of the solid model and each intersection represents a material transition.

4. The method of claim 3 wherein forming the build data includes excluding any rays with an odd number of intersections with the surface of the solid model from the build data.

5. The method of claim 4 wherein the intervals in the list of intervals are defined, by the intersections of the surface of the solid model.

6. The method of claim 1, wherein the model data comprises a representation of a material transition surface of the object, and the processing of the model data comprises identifying intersections of a ray extending along the third dimension with the material transition surface.

7. The method of claim 6, wherein the model data comprises a representation of a plurality of surface tiles making up the material transition surface and identifying intersections of the ray with the material transition surface comprises identifying intersections of the ray with the surface tiles.

8. The method of claim 1 wherein the build data is formed prior to printing layers of the object.

9. The method of claim 1 wherein the material associated with at least some interval is defined functionally in the material transition data.

10. The method of claim 1 wherein determining the material to deposit at a location includes inferring the material to deposit based on materials associated with other locations.

11. The method of claim 1 wherein the surface height data is obtained by scanning a surface of the partially fabricated object.

12. The method of claim 1 wherein the height of the partial fabrication of the object is non-constant across the surface of the partial fabrication.

13. The method of claim 1 wherein the model data includes an assembly of model objects.

14. The method of claim 13 wherein each model object of the assembly of model objects is associated with a different material.

15. The method of claim 1, wherein the build data includes coordinates of material transitions represented at a resolution greater than an addressable resolution for printing.

16. The method of claim 1, wherein the coordinate of material transition at an end of the interval is represented as a relative coordinate of another material transition.

17. The method of claim 1, wherein the material associated with an interval is functionally defined.

18. The method of claim 1, wherein at least some of the material transitions represented in the build data are transitions between different curable materials.

19. The method of claim 1, wherein the object comprises support material and a curable material, and wherein at least some of the material transitions represented in the build data are transitions between the support material and the curable material.

20. A non-transitory machine-readable medium comprising instructions stored thereon, the instructions when executed by a processor cause:
   processing model data representing material transition boundaries of an object to be printed to form build data for use in controlling printing of a plurality of successive layers to form the object, the build data comprising,
      for each location of a plurality of locations in a two-dimensional arrangement, material transition data for representing heights of material transitions in a third dimension,
      wherein the material transition data comprises a list of multiple variable-length intervals along the third dimension, each interval including a coordinate of material transition at an end of the interval, and each interval being associated with a corresponding material; and repeating for each layer of the plurality of successive layers,
- receiving surface height data representing a height of a partial fabrication of the object at respective locations of a plurality of locations on a surface of the partial fabrication,
- for each location of the plurality of locations, using the height at the location to access the material transition data corresponding to the location in the build data, and using the material transition data to determine material to be deposited at that location by comparing the height and a coordinate of a material transition in the material transition data, and
- causing emission of the determined material at each location of the plurality of locations, thereby causing printing of the layer.

\* \* \* \* \*